(12) United States Patent
Asada et al.

(10) Patent No.: US 7,778,760 B2
(45) Date of Patent: Aug. 17, 2010

(54) DRIVING AMOUNT CONTROLLER

(75) Inventors: Yukihiro Asada, Saitama (JP); Makoto Tsuyuguchi, Saitama (JP); Toru Takeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/057,219

(22) Filed: Mar. 27, 2008

(65) Prior Publication Data
US 2008/0236545 A1 Oct. 2, 2008

(30) Foreign Application Priority Data
Mar. 30, 2007 (JP) ............... 2007-095467

(51) Int. Cl.
*B60T 7/12* (2006.01)

(52) U.S. Cl. ............... 701/103; 701/110; 123/399

(58) Field of Classification Search ............... 123/349, 123/350, 352, 353, 361, 376, 399; 701/103, 701/110
See application file for complete search history.

(56) References Cited

U.S. PATENT DOCUMENTS 5,420,793 A * 5/1995 Oo et al. ............... 701/93
6,848,420 B2 * 2/2005 Ishiguro et al. ............... 123/399
2003/0187564 A1 * 10/2003 Yasui et al. ............... 701/102
2004/0035393 A1 * 2/2004 Ishiguro et al. ............... 123/399

FOREIGN PATENT DOCUMENTS

| EP | 0 979 934 A2 | 2/2000 |
| EP | 1 312 774 A2 | 5/2003 |
| JP | 61-106934 A | 5/1986 |
| JP | 2003-216206 A | 7/2003 |
| JP | 2006-307797 A | 11/2006 |

* cited by examiner

*Primary Examiner*—Stephen K Cronin
*Assistant Examiner*—Anthony L Bacon
(74) *Attorney, Agent, or Firm*—Birch, Stewart, Kolasch & Birch, LLP

(57) ABSTRACT

A driving amount controller is provided for a vehicle. An ECU on the vehicle reduces a damping output Udamp when the deviation e between the target opening DTHR of the throttle valve and the actual opening DTH is near zero or when a switching function value σ is near zero. This makes it possible to reduce the damping output Udamp immediately after the start of, or immediately before the end of, the control of the opening of the throttle valve when the deviation e or the switching function value σ is near zero, and to realize a high response performance as to the control of the actual opening DTH of the throttle valve.

23 Claims, 14 Drawing Sheets

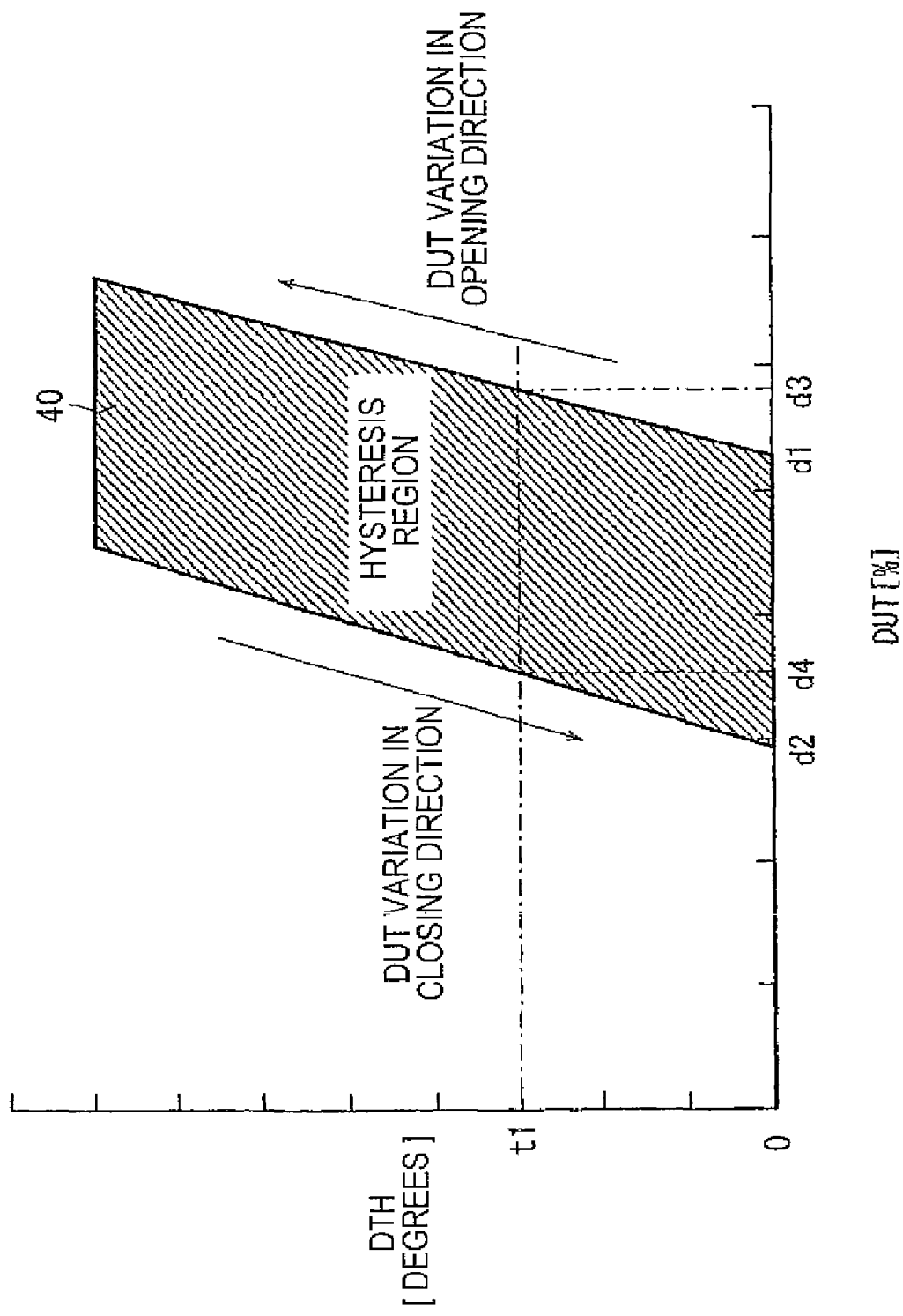

DRIVING AMOUNT CONTROLLER

CROSS-REFERENCE TO RELATED APPLICATION

The present application claims priority under 35 U.S.C. §119 to Japanese Patent Application No. 2007-095467, filed Mar. 30, 2007, the entire contents of which are hereby incorporated by reference.

BACKGROUND OF THE INVENTION

1. Field of the Invention

The present invention relates to a driving amount controller for controlling a driving amount of a target system (for example, the opening of a throttle valve) by way of the output of a motor.

2. Description of Background Art

The output of an engine in a motorcycle or a four-wheel vehicle is, in general, controlled by use of a throttle grip or an accelerator pedal. More specifically, the output of the engine is determined by regulation according to the turning amount of the throttle grip or the step-in amount of the accelerator pedal.

Ordinarily, a throttle valve is connected to a motor and a return spring, and the regulation of the opening is conducted by a method in which the throttle valve is energized in the valve opening direction by the motor and is energized in the valve closing direction by the motor and the return spring.

Since the opening of the throttle valve is regulated through the motor and the return spring as above-mentioned, a response delay may sometimes be generated in the control of the opening of the throttle valve (and in the actual engine output corresponding thereto) in response to the operation of the throttle grip or the accelerator pedal. There have been proposed a variety of devices for coping with such a response delay (for example, refer to Japanese Patent Laid-open No. 2003-216206, Japanese Patent Laid-open No. Sho 61-106934, and Japanese Patent Laid-open No. 2006-307797.

However, each of the devices disclosed in Japanese Patent Laid-open No. 2003-216206, Japanese Patent Laid-open No. Sho 61-106934, and Japanese Patent Laid-open No. 2006-307797, have room for improvement as to a response performance and/or an erroneous deviation in the control of the opening of a throttle valve.

SUMMARY AND OBJECTS OF THE INVENTION

The present invention has been made in consideration of the above-mentioned problems. Accordingly, it is an object of the present invention to provide a driving amount controller which can reduce a response delay in control of a driving amount of a controlled system, such as in control of the opening of a throttle valve.

According to an embodiment of the present invention, there is provided a driving amount controller for controlling a driving amount of a controlled system by way of an output of a motor, including: a target driving amount input means for inputting a target driving amount for the controlled system; and a control means for transmitting to the motor a control signal for controlling the output of the motor with an output characteristic according to the target driving amount, wherein the control means adds to the control signal a damping output for suppressing an overshoot of an actual driving amount relative to the target driving amount for the controlled system at the time of generating the control signal, and reduces the damping output when a deviation between the target driving amount for the controlled system and the actual driving amount is near zero or when a switching function value in sliding mode control is near zero.

According to an embodiment of the present invention, the damping output is reduced when the deviation between the target driving amount of the controlled system and the actual driving amount is near zero or when a switching function value in a sliding mode control is near zero, and, as a result, the influence of the damping output on the output of the motor is reduced. In general, the deviation is near zero immediately after the control of the driving amount of the controlled system, such as control of the opening of a throttle valve, is started according to an operation of a target driving amount input means such as a throttle grip or immediately before the actual driving amount of the controlled system reaches the target driving amount inputted through the target driving amount input means.

In addition, when the switching function value is near zero, the actual driving amount converges while maintaining the robust property of the target driving amount. In these cases, the possibility for the actual driving amount to overshoot the target driving amount is low, whereas a high response performance is required for the next acceleration or deceleration. Therefore, according to the present invention, a high response performance as to the control of the driving amount of the controlled system can be realized in these cases.

In the above configuration, preferably, the control means increases the damping output according to an increase in the variation in the deviation per unit time or to an increase in the variation of the switching function value per unit time.

In general, the variation in the deviation per unit time or the variation in the switching function value per unit time varies depending on the acceleration of the controlled system. In addition, where the acceleration is great, the actual driving amount is liable to exceed (liable to overshoot) the target driving amount. Therefore, by increasing the damping output according to an increase in the variation of the deviation per unit time or the variation in the switching function value per unit time, it becomes easier to suppress the overshoot as just mentioned. Particularly, in the case of the configuration in which the damping output is reduced when the deviation or the switching function value is near zero as above-mentioned, it is possible to prevent the overshooting from occurring when the variation in the deviation per unit time or the variation in the switching function value per unit time is large, even though the deviation or switching function value is near zero.

According to an embodiment of the present invention, the damping output is reduced when the deviation between the target driving amount for the controlled system and the actual driving amount is near zero or when a switching function value in a sliding mode control is near zero, and, as a result, the influence of the damping output on the output of the motor is reduced. In general, the deviation is near zero immediately after the control of the driving amount of the controlled system, such as control of the opening of a throttle valve, is started according to an operation of a target driving amount input means such as a throttle grip or immediately before the actual driving amount of the controlled system reaches the target driving amount inputted through the target driving amount input means.

In addition, when the switching function value is near zero, the actual driving amount converges while maintaining the robust property of the target driving amount. In these cases, the possibility for the actual driving amount to overshoot the target driving amount is low, whereas a high response performance is required for the next acceleration or deceleration. Therefore, according to the present invention, a high response performance as to the control of the driving amount of the controlled system can be realized in these cases.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 shows a hysteresis characteristic in the relationship between the duty ratio of the control signal and the actual opening of the throttle valve.

DETAILED DESCRIPTION OF THE PREFERRED EMBODIMENTS

Figure 1:
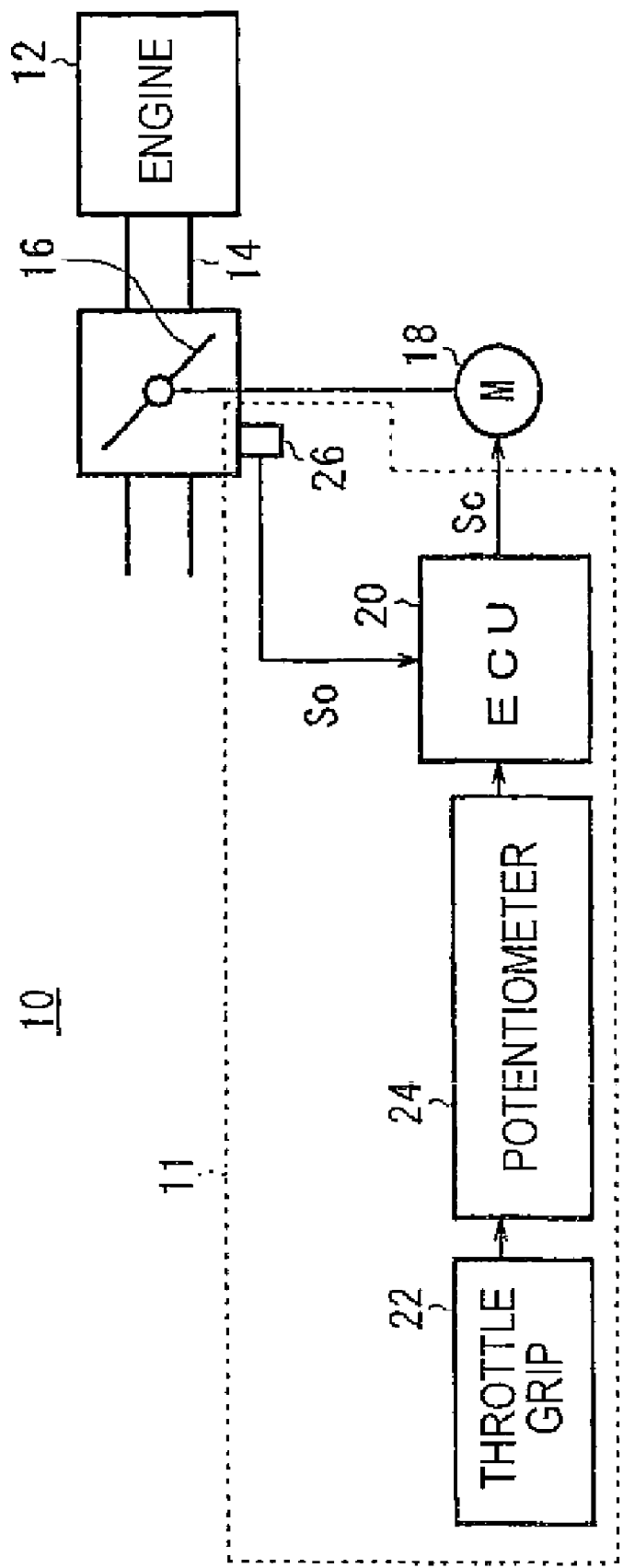
FIG. 1 is a block diagram showing the schematic configuration of a vehicle on which an engine output controller according to an embodiment of the present invention is mounted.

FIG. 1 shows a functional block diagram of a vehicle 10 on which an engine output controller 11 according to an embodiment of the present invention is mounted. In this embodiment, the vehicle 10 is a motorcycle, and the vehicle 10 has an engine 12. An intake passage 14 connected to the engine 12 is equipped therein with a throttle valve 16 for controlling the quantity of air supplied into the engine 12. The throttle valve 16 is attached to a return spring (not shown), which energized (biases) the throttle valve 16 in the direction for closing the throttle valve 16. In addition, a motor 18 is connected to the throttle valve 16 through a gearing (not shown), whereby the opening of the throttle valve 16 can be regulated. The motor 18 is controlled by an electronic control unit (ECU) 20.

The opening TH [degrees] of the throttle valve 16 is determined according to the rotation amount ROT [degrees] of a throttle grip 22 provided at a steering handle part of the vehicle 10, and the rotation amount ROT is detected by a potentiometer 24 connected to the throttle grip 22. The value detected by the potentiometer 24 is transmitted to the ECU 20, and the ECU 20 outputs a control signal Sc according to the detected value to the motor 18. The opening TH of the throttle valve 16 regulated by the motor 18 is detected by a throttle valve opening sensor 26, and the detected value is transmitted as an opening information signal So to the ECU 20.

In this embodiment, the engine output controller 11 includes the ECU 20, the throttle grip 22, the potentiometer 24 and the throttle valve opening sensor 26.

The flow of engine output control is described next.

Figure 2:
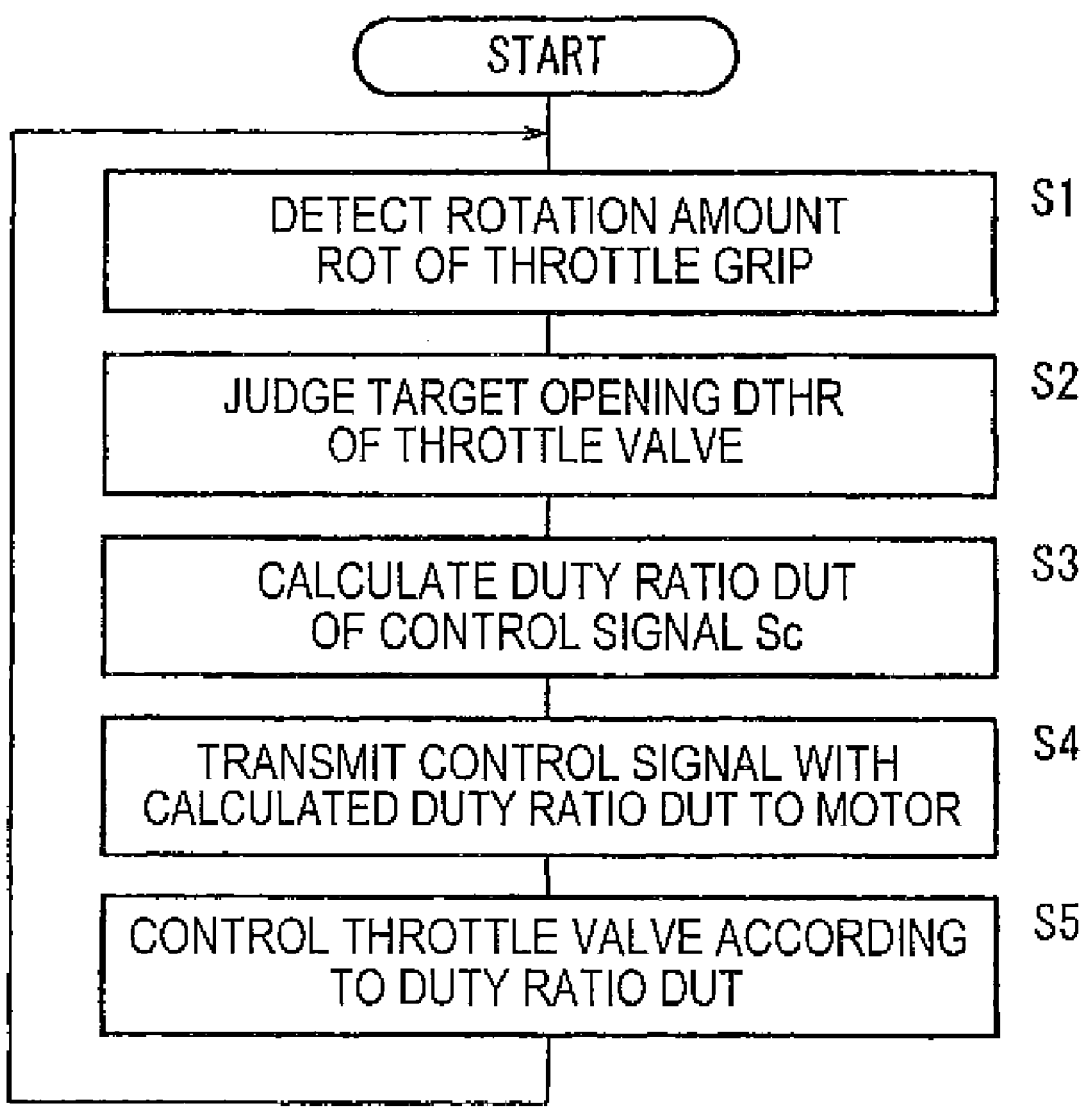
FIG. 2 is a flowchart for controlling the output of the engine by use of the engine output controller.

FIG. 2 shows a flowchart for regulating the opening of the throttle valve 16.

In step S1, when the throttle grip 22 is rotated by the driver in the condition where the engine 12 has been started, the rotation amount ROT [degrees] is detected by the potentiometer 24.

In step S2, the ECU 20 judges a target opening DTHR [degrees] of the throttle valve 16, based on the value detected by the potentiometer 24. The target opening DTHR is a target value for the actual opening DTH [degrees] indicating the opening relative to a default opening THDEF [degrees] (for example, 5 degrees) of the throttle valve 16. The actual opening DTH can be obtained by subtracting the default opening THDEF from the absolute opening TH [degrees] of the throttle valve 16 (DTH=TH−THDEF).

In step S3, the ECU 20 calculates a duty ratio DUT [%] for the control signal Sc to be outputted to the motor 18, and, in step S4, the ECU 20 transmits to the motor 18 the control signal Sc at the duty ratio DUT according to the results of the calculation executed in step S3. With the duty ratio DUT of the control signal Sc varied according to the calculation results, the output of the motor 18 is controlled. Specifically, the control signal Sc contains both signals for turning ON the motor 18 and signals for turning OFF the motor 18, and the presence ratio between the ON signals and the OFF signals within a fixed time is the duty ratio DUT. For example, in the case where the control signal Sc for a time of 1 millisecond contains the ON signals for a total time of 0.6 millisecond and the OFF signals for a total time of 0.4 millisecond, the duty ratio DUT is 60%. A specific method of calculating the duty ratio DUT will be described later.

In step S5, the motor 18, upon receiving the control signal Sc from the ECU 20, regulates the opening of the throttle valve 16 through an output according to the duty ratio DUT. As a result, air in a quantity according the actual opening DTH of the throttle valve 16 is supplied into the engine 12, and a fuel in an amount according to the quantity of the air is injected into the engine 12, whereby the output of the engine 12 is controlled.

The processes of steps S1 to S5 are repeated until the engine 12 is stopped.

The judgment of target opening DTHR (step S2) is described next.

The target opening DTHR for the throttle valve 16 is determined according to the rotation amount ROT of the throttle grip 22. For example, the target opening DTHR can be determined in proportion to a pulse output from the potentiometer 24. Or, alternatively, the target opening DTHR may be determined by any of the methods described in the patent documents.

Calculation of the duty ratio DUT (step S3) is described next:

The calculation of the duty ratio DUT as above-mentioned is carried out based on a sliding mode control similar to that in Japanese Patent Laid-open No. 2003-216206. The sliding mode control is detailed in "Sliding Mode Control—Design Theory of Nonlinear Robust Control—" (written by Kenzoh Nonami and Hiroki Den, published by Corona Publishing Co., Ltc., 1994), and is not detailed here.

In this embodiment, the duty ratio DUT is defined by the following formula (1):

$$DUT[k]=Ueq[k]+Urch[k]+U\text{damp}[k]+U\text{dutgap}[k] \quad (1)$$

In the above formula (1), Ueq[k] is equivalent control output, Urch[k] is reaching output, Udamp[k] is damping output, and Udutgap[k] is hysteresis compensation output.

For describing the above-mentioned equivalent control output Ueq[k], reaching output Urch[k], damping output Udamp[k], and hysteresis compensation output Udutgap[k], basic terms will be defined in advance.

In the following description, a1, a2, b1, and c1 are model parameters determining the characteristics of a controlled system model (refer to Japanese Patent Laid-open No. 2003-216206, paragraph [0027], etc.).

In the following, e is the erroneous deviation [degrees] between the actual opening DTH and the target opening DTHR, and is defined by the following formula (2) (refer to Japanese Patent Laid-open No. 2003-216206, paragraph [0035], etc.):

$$e[k]=DTH[k]-DTHR[k] \quad (2)$$

VPOLE is a switching function setting parameter which is set as larger than −1 as well as smaller than 1 (refer to Japanese Patent Laid-open No. 2003-216206, paragraphs [0030], [0035], [0037], [0038], etc.).

σ is a switching function value, which is defined by the following formula (3) (refer to Japanese Patent Laid-open No. 2003-216206, paragraph [0035], etc.):

$$\sigma[k] = e[k] + VPOLE \cdot e[k-1] = \\ (DTH[k] - DTHR[k]) + VPOLE \cdot (DTH[k] - DTHR[k]) \quad (3)$$

The equivalent control output Ueq is an output for converging the erroneous deviation e between the actual opening DTH of the throttle valve 16 and the target opening DTHR to zero and constraining it on a switching straight line when the switching function value σ is zero, and the equivalent control output Ueq is defined by the following formula (4):

$$Ueq[k] = \{(1-a1-VPOLE)\cdot DTH[k] + (VPOLE-a2)\cdot DTH[k-1] + \\ KDDTHR \cdot (DTHR[k]-DTHR[k-1])^2 - c1\} \cdot (1/b1) \quad (4)$$

Here, the terms "(1−a1−VPOLE)·DTH[k]", "(VPOLE−a2)DTH[k−1]" and "−c1" in the right-hand side and the coefficient "1/b1" in the right-hand side are the same as in the formula (8a) in the paragraph [0078] in Japanese Patent Laid-open No. 2003-216206, and their details are described in Japanese Patent Laid-open No. 2003-216206; therefore, detailed description of them is omitted here.

On the other hand, the term "KDDTHR·(DTHR[k]−DTHR[k−1])²" (hereinafter, the term as a whole will be referred to also as "the add-in amount x to the duty ratio DUT" or "the add-in amount x") in the right-hand side is a term characteristic of the present invention, and will be detailed below.

Here, the coefficient "KDDTHR" represents a positive coefficient (in this embodiment, it is "1"). The coefficient "(DTHR[k]−DTHR[k−1])²", is the square of the difference between the current target opening DTHR[k] and the last target opening DTHR[k−1].

Figure 3:
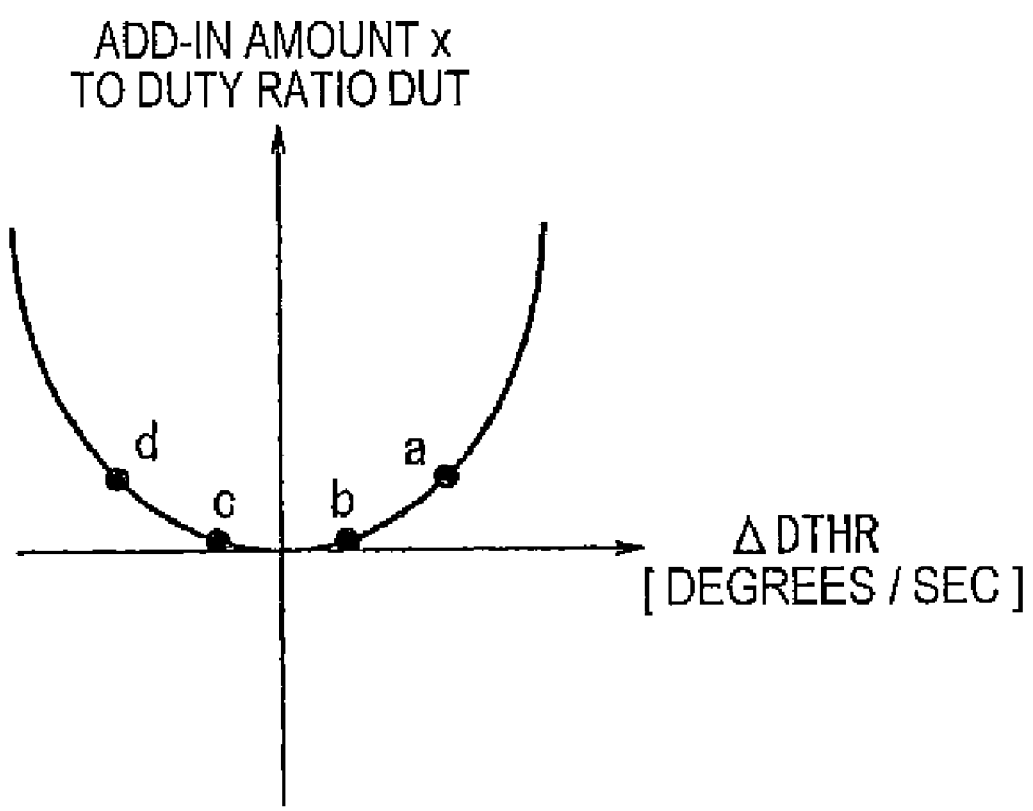
FIG. 3 shows the relationship between the speed variation of the target opening of a throttle valve and the add-in amount to the duty ratio of a control signal.

As shown in FIG. 3, the graph of the add-in amount x is a positive quadratic curve of which the vertex coincides with the origin, and the absolute value of the inclination of a tangent to the curve increases as the point of contact comes away from the origin. Therefore, in the region where the axis of abscissas is positive, the increment in the equivalent control output Ueq[k] (the add-in amount x to the duty ratio DUT) increases with an increase in the difference between the current target opening DTHR[k] and the last target opening DTHR[k−1] (namely, in the speed variation ΔDTHR [degrees/sec] of the target opening DTHR).

As a result, when the vehicle 10 is accelerated rapidly, the increment in the add-in amount x (the equivalent control output Ueq) increases and, hence, the duty ratio DUT also increases. Therefore, at the time of a rapid acceleration of the vehicle 10, the torque of the motor 18 is increased by an amount corresponding to the add-in amount x, so that the motor 18 opens the throttle valve 16 swiftly, whereby the output of the engine 12 can be increased rapidly.

Figure 4:
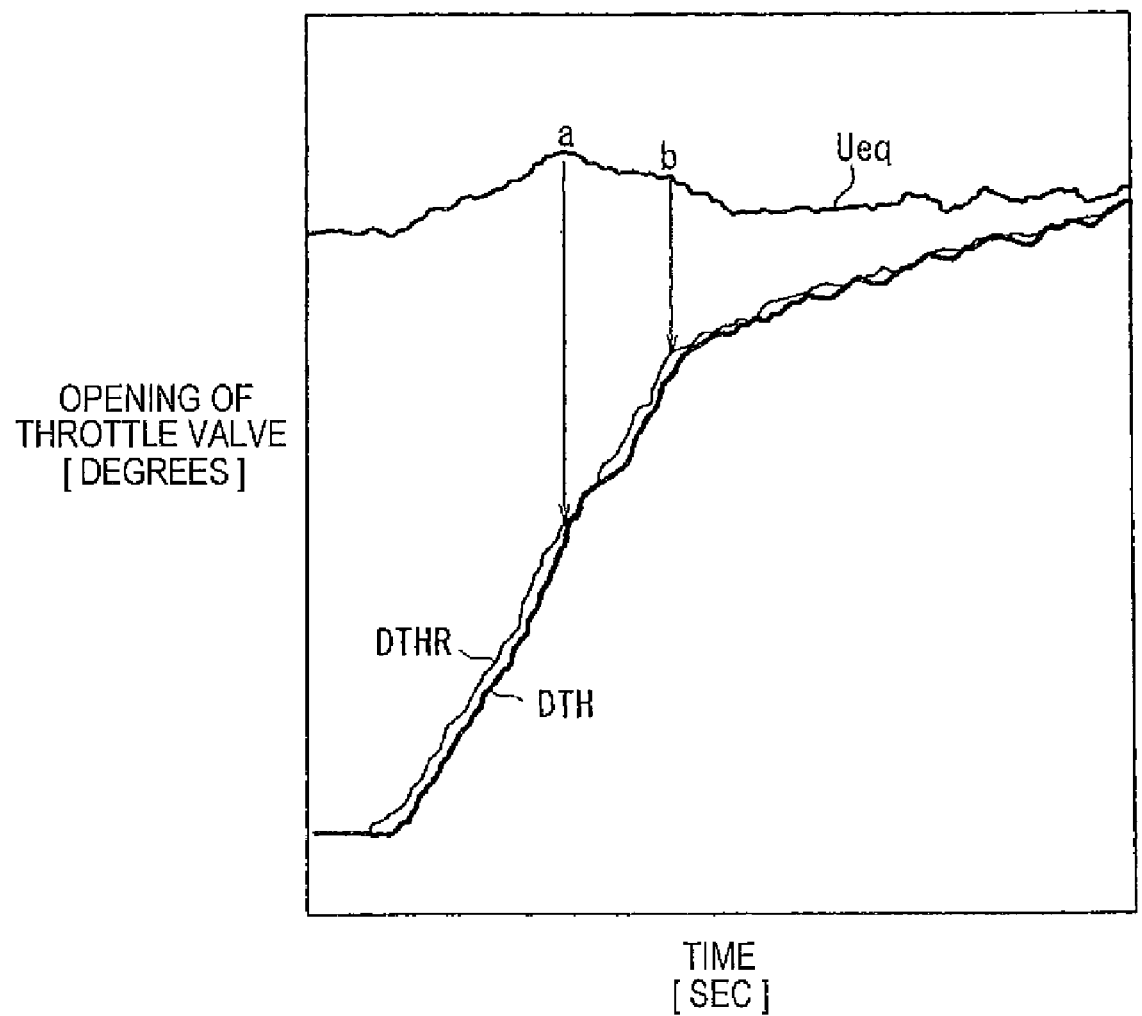
FIG. 4 shows specific waveforms of the target opening and the actual opening of the throttle valve and the equivalent control output at the time of vehicle acceleration.

FIG. 4 shows the target opening DTHR, the actual opening DTH and the equivalent control output Ueq when the vehicle 10 is accelerated. Points a and b in FIG. 4 correspond to points a and b in FIG. 3. As seen from FIG. 3, the speed variation ΔDTHR of the target opening DTHR is greater at point a than at point b. Besides, as shown in FIG. 4, the equivalent control output Ueq corresponding to point a is greater than the equivalent control output Ueq corresponding to point b. As a result, in FIG. 4, there is little difference between the target opening DTHR and the actual opening DTH.

On the other hand, in the region where the axis of abscissas is negative, the increment in the add-in amount x (the equivalent control output Ueq[k]) to the duty ratio DUT increases with an increase in the difference between the current target opening DTHR[k] and the last target opening DTHR[k−1]. Therefore, when the vehicle 10 is rapidly decelerated, the reduction in the duty ratio DUT is comparatively moderate. Accordingly, the minus torque exerted on the motor 18 at the time of rapid deceleration of the vehicle 10 is reduced by an amount corresponding to the add-in amount x, whereby the closing speed of the throttle valve 16 is lowered, resulting in that the output of the engine 12 can be reduced moderately.

Figure 5:
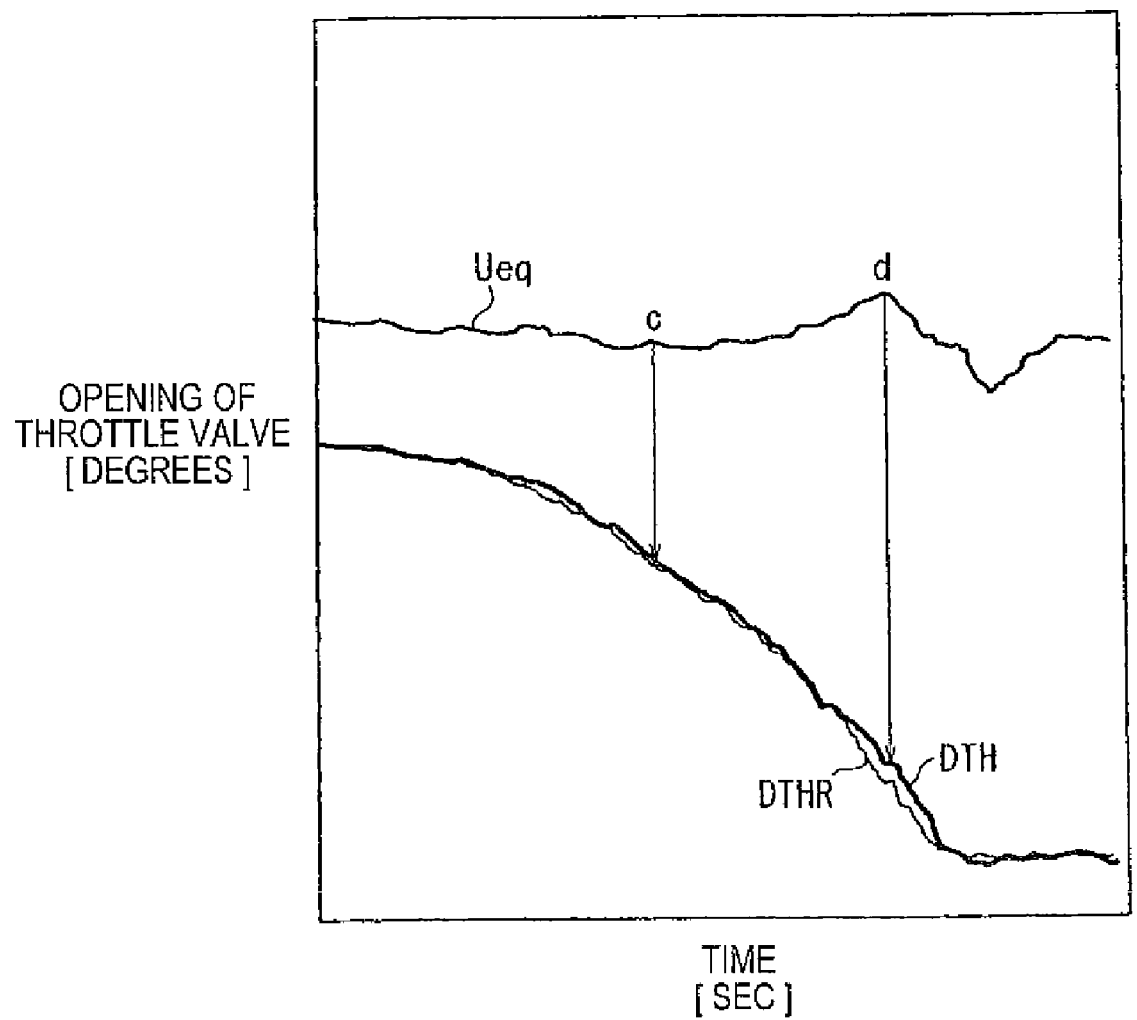
FIG. 5 shows specific waveforms of the target opening and the actual opening of the throttle valve and the equivalent control output at the time of vehicle deceleration.

FIG. 5 shows the target opening DTHR, the actual opening DTH and the equivalent control output Ueq when the vehicle 10 is decelerated. Points c and d in FIG. 5 correspond to points c and d in FIG. 3. As seen from FIG. 3, the speed variation ΔDTHR of the target opening DTHR is smaller at point d than at point c (the absolute value of the speed variation ΔDTHR is greater at point d). Besides, as shown in FIG. 5, the equivalent control output Ueq corresponding to point d is greater than the equivalent control output Ueq corresponding to point c. As a result, in FIG. 5, there is little difference between the target opening DTHR and the actual opening DTH.

The reaching output Urch is an output for constraining the switching function value σ to zero, and is defined by the following formula (5):

$$Urch[k]=(-F/b1)\cdot \sigma[k] \quad (5)$$

This formula (5) is like the formula (9a) in Japanese Patent Laid-open No. 2003-216206, and detailed description thereof is omitted here.

The damping output Udamp is an output for preventing the actual opening DTH from overshooting the target opening DTHR, and is defined by the following formula (6):

$$Udamp[k]=-Kdamp\cdot(\sigma[k]-\sigma[k-1])/b1 \quad (6)$$

Here, Kdamp is a gain characteristic value, and is defined by the following formula (7):

$$Kdamp=T\_Kdump1\cdot T\_Kdump2 \quad (7)$$

Figure 6:
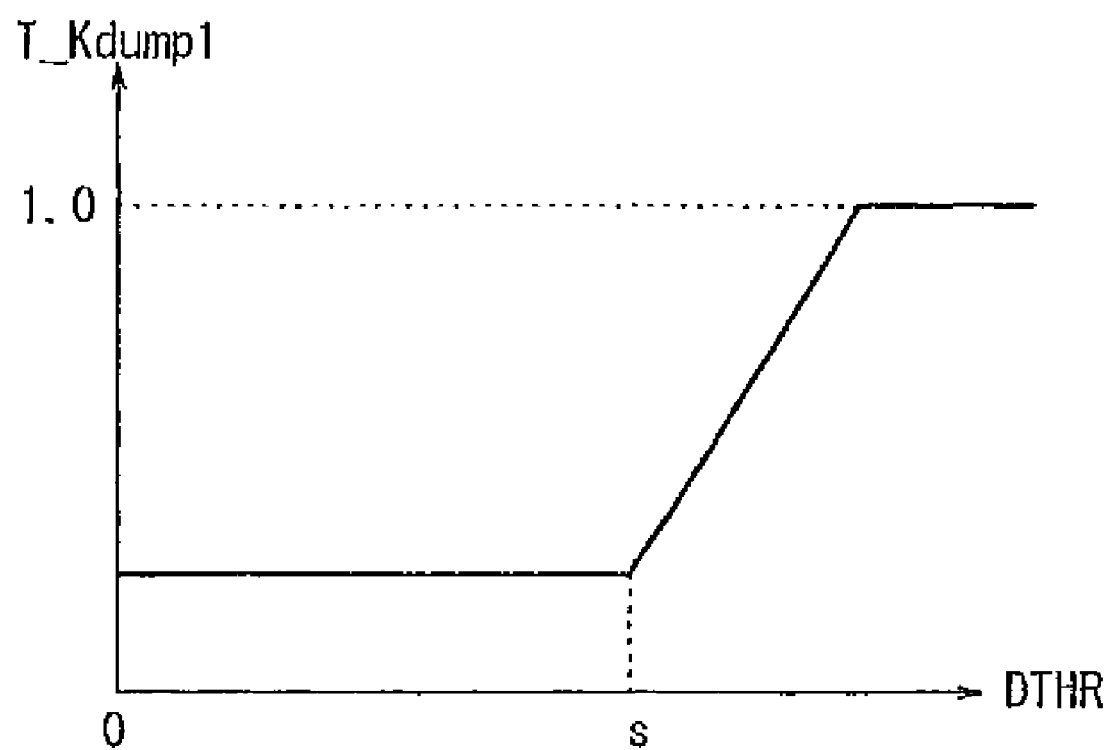
FIG. 6 shows the relationship between the target opening of the throttle valve and the output gain.

The gain characteristic value T_Kdump1, as shown in FIG. 6, is a positive gain characteristic value which is enlarged when the target opening DTHR of the throttle valve 16 exceeds a positive predetermined value s. Since the gain characteristic value T_Kdump2 has a positive value as described later and the gain characteristic value Kdamp is multiplied by −1 (refer to the formula (6)), the gain characteristic value T_Kdump1 is enlarged in the plus direction when the opening of the throttle valve 16 is enlarged, and, as a result, the damping output Udamp is enlarged in the minus direction. Therefore, by use of the gain characteristic value T_Kdump1, it is possible to prevent the overshoot upon rapid acceleration of the vehicle 10.

Figure 7:
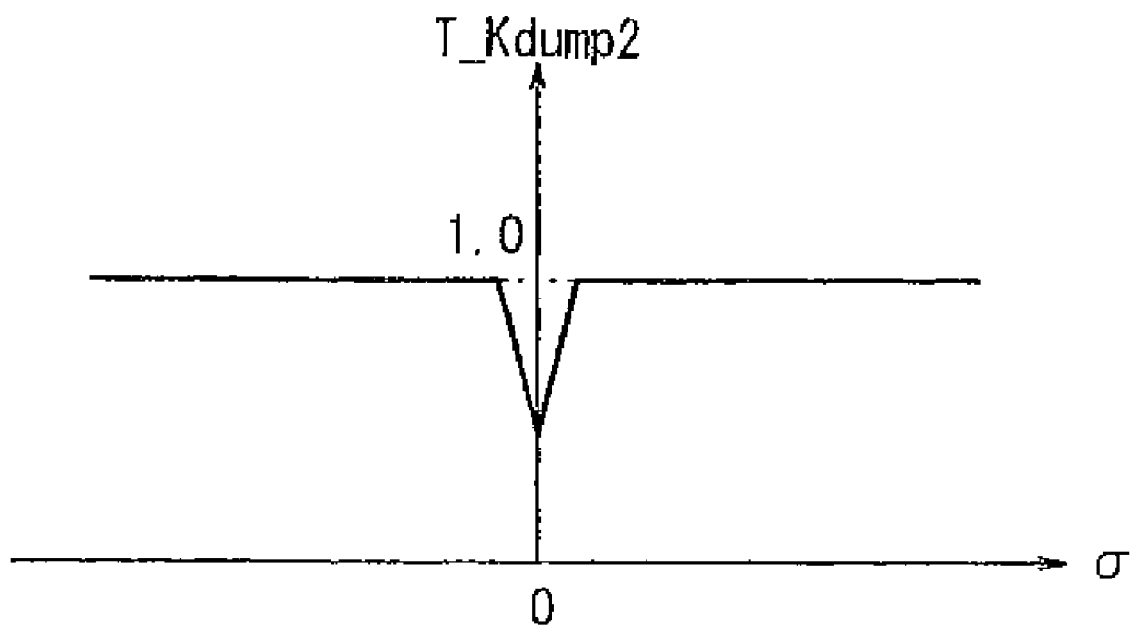
FIG. 7 shows the relationship between the switching function value and the output gain.

In addition, the gain characteristic value T_Kdump2, as shown in FIG. 7, is a positive gain characteristic value which is reduced when the switching function value σ is in the vicinity of zero. Since the gain characteristic value T_Kdump1 has a positive value as described above and the gain characteristic value Kdamp is multiplied by −1, the gain characteristic value T_Kdump2 is enlarged when the switching function value σ has a value far from zero, with the result that the value of the damping output Udamp is enlarged. Therefore, when the switching function value σ has a value far from zero, i.e., when the robust property is small, the absolute value of the damping output Udamp can be made to be large, whereby the switching function value σ can be brought close to the switching straight line, thereby enhancing the robust property.

In this embodiment, by storing the gain characteristic value T_Kdump1 and the gain characteristic value T_Kdump2 in a table form, it is possible to calculate the gain characteristic value Kdamp swiftly.

Figure 8:
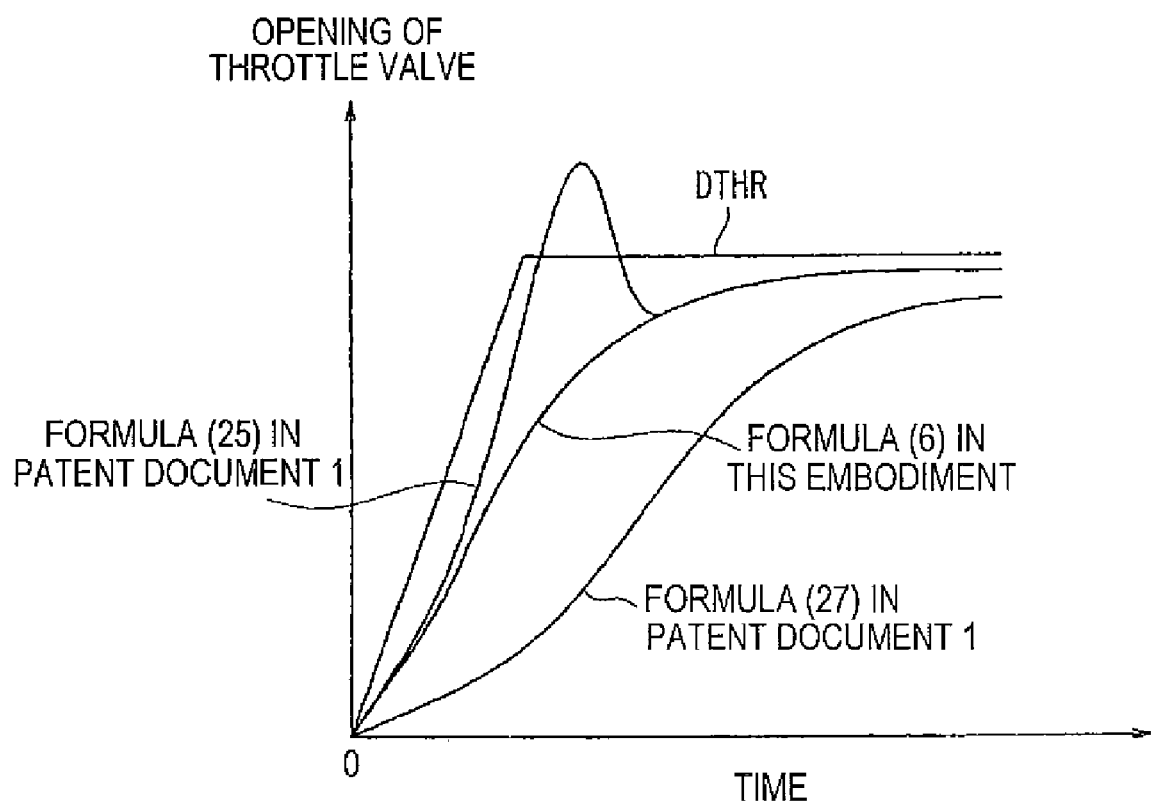
FIG. 8 shows a exemplary comparison of the target opening of the throttle valve with the actual opening obtained by use of a damping output according to the present invention and the actual opening based on the related art.

Incidentally, FIG. 8 shows a diagram for comparing the target opening DTHR with the actual opening DTH obtained by use of the damping output Udamp based on the formula (6) and the actual opening DTH obtained by use of the damping outputs Udamp based on the formula (25) and the formula (27) in Japanese Patent Laid-open No. 2003-216206.

As seen from FIG. 8, the actual opening DTH obtained by use of the damping output Udamp based on the formula (25) in Japanese Patent Laid-open No. 2003-216206 overshoots the target opening DTHR. In addition, the actual opening DTH obtained by use of the damping output Udamp based on the formula (6) hereinabove realizes a higher-speed follow-up performance, as compared with the actual opening DTH obtained by use of the damping output Udamp based on the formula (27) in Japanese Patent Laid-open No. 2003-216206.

The hysteresis compensation output Udutgap is an output obtained by taking into account the hysteresis in regulation of the opening of the throttle valve 16, and is defined by the following formula (8):

$$Udutgap[k]=\{DUTR(DTH[k])-(Ueq[k]+Urch[k]+Udamp[k])\}\cdot Kdut/b1 \quad (8)$$

Figure 9A:
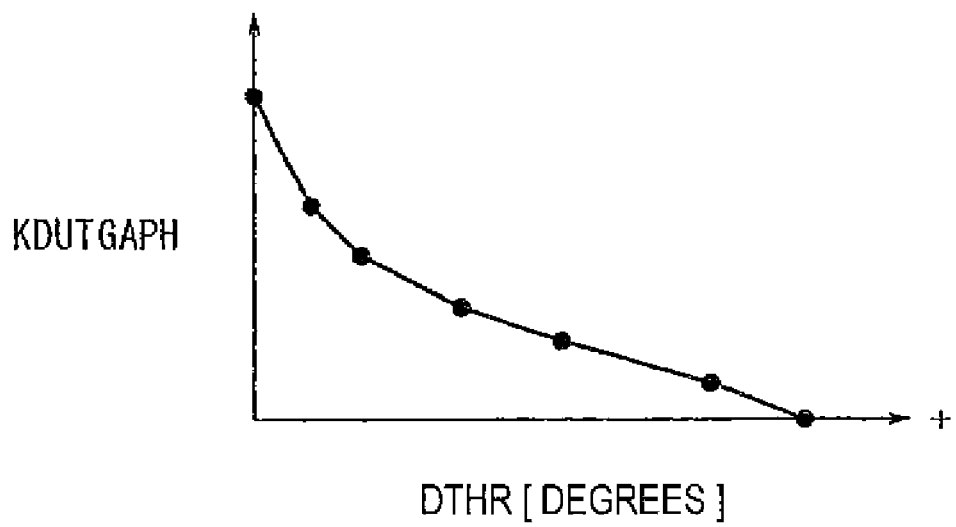
FIGS. 9A and 9B are characteristic diagrams of coefficients used in determining the damping output according to the present invention.
Figure 9B:
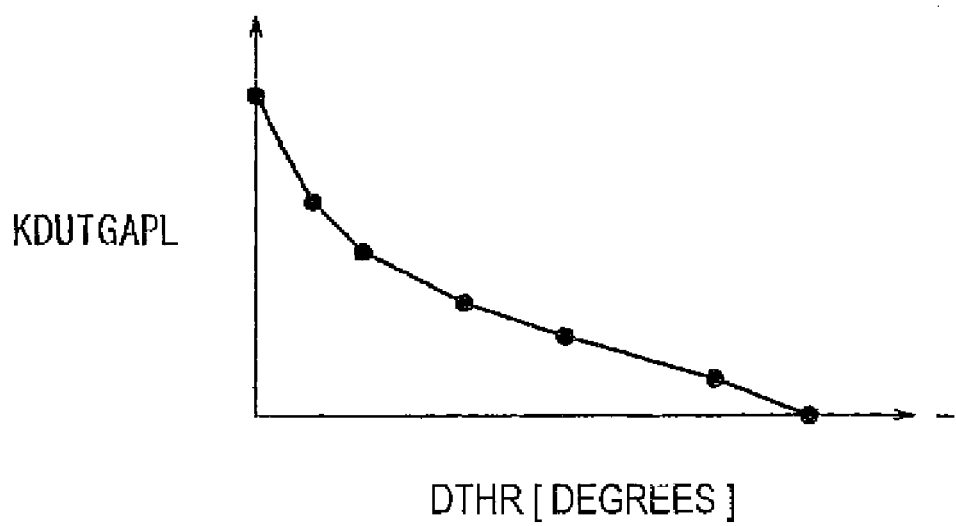

Here, DUTR(DTH[k]) is the value of the duty ratio DUT necessary for operating the throttle valve 16 according to the value of the actual opening DTH[k]. In addition, Kdut includes a coefficient KDUTGAPH and a coefficient KDUTGAPL, and these coefficients KDUTGAPH and KDUTGAPL are functions of the target opening DTHR, as shown in FIGS. 9A and 9B.

Regulation of the opening of the throttle valve 16 by the motor 18 involves a hysteresis characteristic as shown in FIG. 10. Specifically, when the point determined by the duty ratio DUT and the actual opening DTH lies in a hysteresis region 40, the motor 18 does not perform the regulation of the opening. For example, in the case where the throttle valve 16 is in its initial position (DTH=0), the throttle valve 16 starts operating in the opening direction at the time when the duty ratio DUT of the control signal Sc sent from the ECU 20 to the motor 18 is d1 [%]. On the other hand, in the case of operating the throttle valve 16 in the closing direction, the throttle valve 16 returns to its initial position at the time when the duty ratio DUT is d2 [%], which is smaller than d1.

Similarly, in the case where the throttle valve 16 is held (stopped) with the actual opening DTH in the state of t1 [degrees], the duty ratio DUT must be d3 [degrees] in order to operate the throttle valve 16 in the opening direction. On the other hand, it suffices that the duty ratio DUT is d4 (which is smaller than d3) in order to operate the throttle valve 16 in the closing direction.

Incidentally, the main factors which are considered to cause the above-mentioned hysteresis characteristics include a factor intrinsic of the motor, friction in the mechanical system, and energization by the return spring. The factor intrinsic of the motor is the current value at which the motor starts operating, and the current value varies depending on such factors as the positions, shapes, materials and the like of the winding, the core and the like. The friction in the mechanical system includes the friction between the shaft of the motor and the bearing, and the friction between the plurality of gears in the motor. The energization by the return spring is the energization of the throttle valve in the closing direction by the return spring connected to the throttle valve.

In addition, the hysteresis characteristic as shown in FIG. 10 appears when the duty ratio DUT [%] is varied in a fixed manner, and another hysteresis characteristic appears when the variation in the duty ratio DUT is varied.

Figure 11:
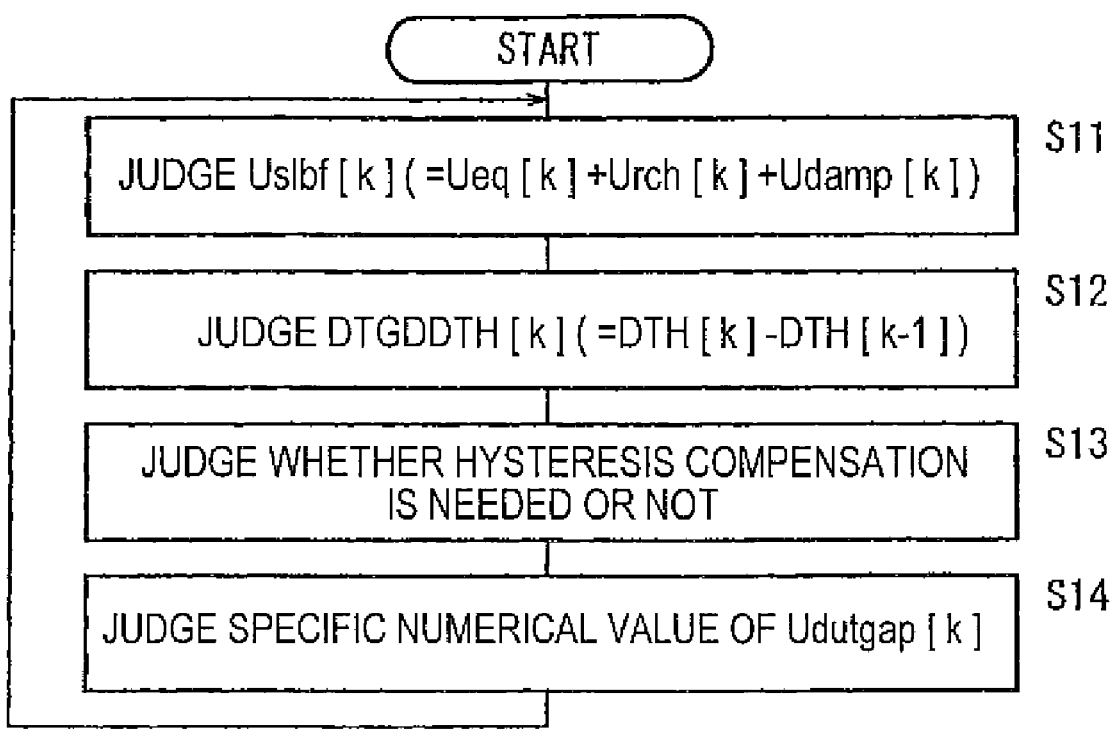
FIG. 11 is a flowchart for judging the hysteresis compensation output according to the present invention.

FIG. 11 shows a flowchart for judging the hysteresis compensation output Udutgap[k].

In step S11, the ECU 20 calculates an output Uslbf (Uslbf [k]=Ueq[k]+Urch[k]+Udamp[k]) obtained by other outputs constituting the duty ratio DUT of the above formula (1) than the hysteresis compensation output Udutgap, i.e., the equivalent control output Ueq, the reaching output Urch and the damping output Udamp.

In step S12, the ECU 20 calculates the difference DTGDDTH[k](DTGDDTH[k]=DTH[k]−DTH[k−1]) between the current actual opening DTH[k] and the last actual opening DTH[k−1].

In step S13, the ECU 20 judges whether the hydteresis compensation is needed or not.

In step S14, the ECU 20 judges a specific numerical value of the hysteresis compensation output Udutgap.

Figure 12:
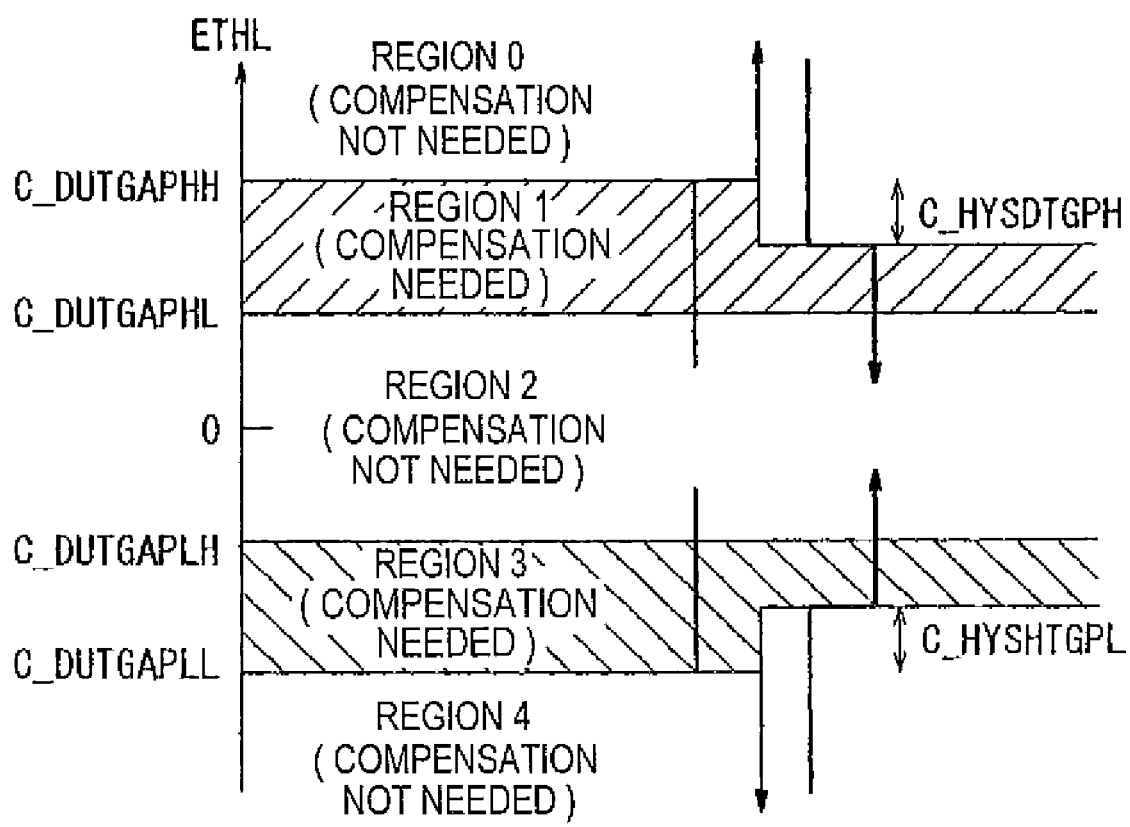
FIG. 12 shows the regions corresponding to whether a hysteresis compensation is needed or not.

As above-mentioned, in step S13, it is judged whether the hysteresis compensation is needed or not. Specifically, as shown in FIG. 12, the ECU 20 presets five regions (region 0 to region 5) for the difference ETHL[k] [degrees] between the target opening DTHR[k] and the actual opening DTH[k], and detects that one of the regions 0 to 5 in which the current difference ETHL lies, thereby judging whether the hysteresis compensation is needed or not.

More specifically, in the case where the difference ETHL is not less than a positive threshold C_DUTGAPHH (this condition is referred to as "region 0"), it is considered that the driver is wanting a very high engine output and that the actual opening DTH of the throttle valve 16 will soon come out of the hysteresis region 40 (FIG. 10), and, therefore, the ECU 20 does not perform the hysteresis compensation. Incidentally, on the basis of hysteresis characteristic, the threshold C_DUTGAPHH has one value at the time of an increase in the difference ETHL and another value at the time of a decrease in the difference ETHL. Specifically, the threshold C_DUTGAPHH is set to be comparatively high for the time when the difference ETHL increases, and the threshold C_DUTGAPHH is set to be comparatively low for the time when the difference ETHL decreases. The difference between the higher value and the lower value is represented by C_HYSDTGPH.

In the case where the difference ETHL is less than the positive threshold C_DUTGAPHH and is more than a positive threshold C_DUTGAPHL (0<C_DUTGAPHL<C_DUTGAPHH) (this condition is referred to as "region 1", except for the exception described below), the ECU 20 judges that the engine output cannot be obtained due to the hysteresis notwithstanding the driver is wanting a moderate acceleration, and basically performs a hysteresis compensation such as to increase the duty ratio DUT of the control signal Sc. It is to be noted here, however, that in the case where the target duty ratio DUTTGTH [%] for the next control signal Sc is less than the output Uslbf (Uslbf=Ueq+Urch+Udamp) obtained in step S11 even though such a hysteresis compensation is not conducted (this case belongs to "region 0"), the hysteresis compensation is not performed.

In the case where the difference ETHL is not more than the positive threshold C_DUTGAPHL and is not less than a negative threshold C_DUTGAPLH (this condition is referred to as "region 2"), the ECU 20 judges that the opening of the throttle valve 16 has not changed, and does not perform any hysteresis compensation.

In the case where the difference ETHL is less than the negative threshold C_DUTGAPLH and is more than a negative threshold C_DUTGAPLL (C_DUTGAPLL<C_DUTGAPLH<0) (this condition is referred to as "region 3", except for the exception described below), the ECU 20 judges that the engine output would be enlarged due to the hysteresis notwithstanding the driver is wanting a moderate deceleration, and performs a hysteresis compensation such as to reduce the duty ratio DUT of the control signal Sc. It is to be noted here, however, that in the case where the next target duty ratio DUTTGTL [%] is less than the output Uslbf (Uslbf=Ueq+Urch+Udamp) obtained in step S11 even though such a hysteresis compensation is not conducted (this case belongs to "region 4"), the hysteresis compensation is not performed.

In the case where the difference ETHL is not more than the negative threshold C_DUTGAPLL (this condition is referred to as "region 4"), the hysteresis compensation is not conducted. Incidentally, on the basis of hysteresis characteristic, the threshold C_DUTGAPLL has one value at the time of an increase in the difference ETHL and another value at the time of a decrease in the difference ETHL. Specifically, the threshold C_DUTGAPLL is set to be comparatively low (enlarged in the minus direction) for the time when the difference ETHL increases (varies in the minus direction), and the threshold C_DUTGAPLL is set to be comparatively high (reduced in the minus direction) for the time when the difference ETHL decreases (varies in the positive direction). The difference between the higher value and the lower value is represented by C_HYSDTGPL.

Figure 13:
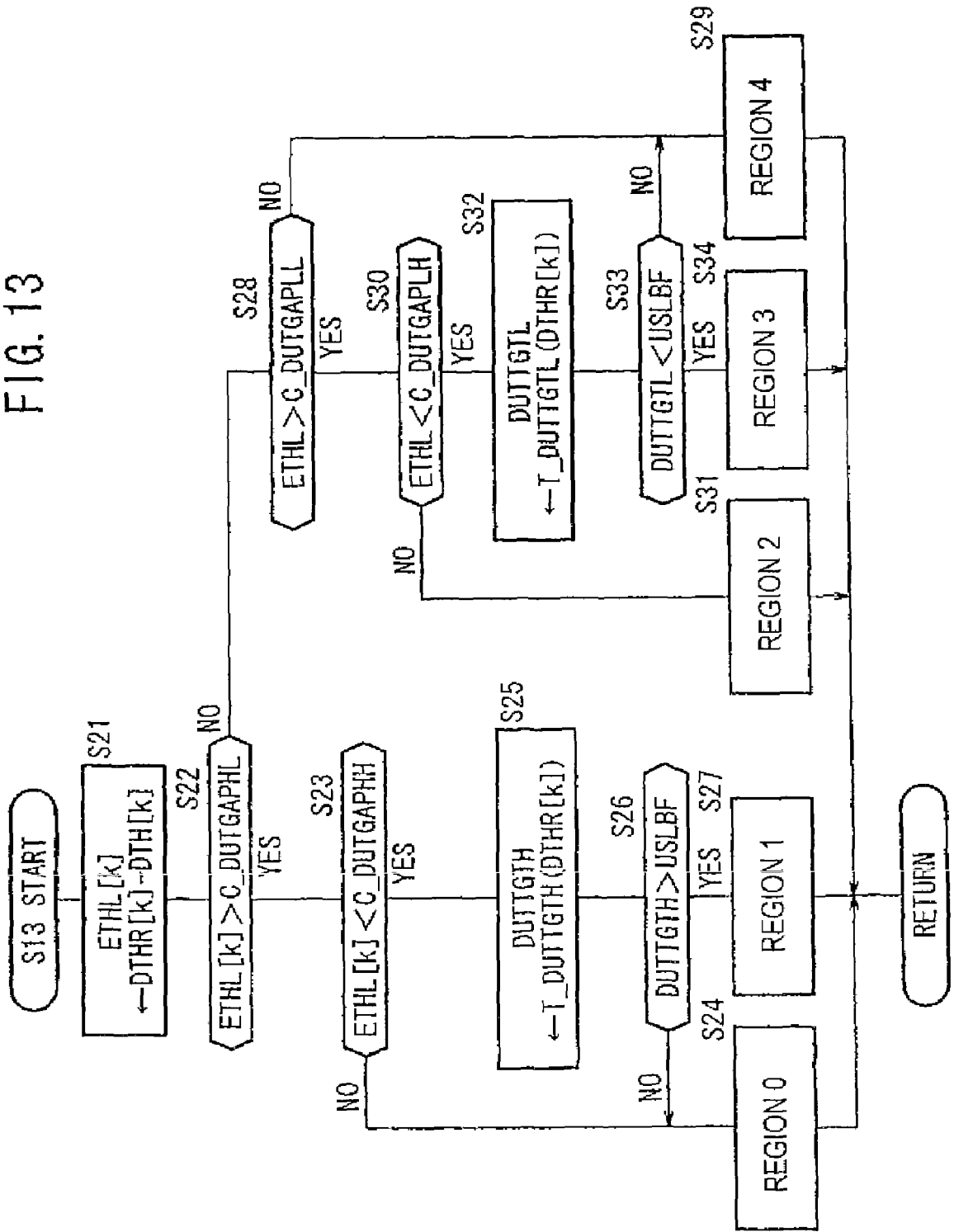
FIG. 13 is a flowchart for judging the regions.

FIG. 13 shows a flowchart for a process in the above-mentioned step S13 (a process for judging regions 0 to 5 in FIG. 12).

Specifically, in step S21, the ECU 20 calculates the difference ETHL[k] (ETHL[k]=DTHR[k]−DTH[k]) between the current target opening DTHR[k] and the current actual opening DTH[k].

In step S22, the ECU 20 judges whether or not the difference ETHL[k] is larger than the positive threshold C_DUTGAPHL (see FIG. 12) which is for judging whether a movement in the opening direction made by the throttle valve 16 is intended or not. In the case where the difference ETHL[k] is larger than the threshold C_DUTGAPHL, step S23 is entered, whereas in the case where the difference ETHL[k] is not more than the threshold C_DUTGAPHL, step S28 is entered.

In step S23, the ECU 20 judges whether or not the difference ETHL[k] is smaller than the positive threshold C_DUTGAPHH which is for judging whether or not the throttle valve 16 actually moves in the opening direction. In the case where the difference ETHL[k] is not less than the positive threshold C_DUTGAPHH, step S24 is entered, and the ECU 20 judges that the movement in the opening direction made by the throttle valve 16 is so large that no hysteresis compensation is needed, in other words, the difference ETHL lies in region 0 in FIG. 12 and no hysteresis compensation is needed. On the other hand, in the case where the difference ETHL[k] is judged to be smaller than the threshold C_DUTGAPHH in step S23, step S25 is entered.

In step S25, the ECU 20 judges a target duty ratio DUTTGTH [%] necessary for actually moving the throttle valve 16 in the opening direction, according to the target opening DTHR. The target duty ratio DUTTGTH is preliminarily stored in a memory (not shown) on the basis of each target opening DTHR.

In step S26, the ECU 20 judges whether or not the target duty ratio DUTTGTH is larger than the output Uslbf (Uslbf=Ueq+Urch+Udamp) which has been judged in step S11. In the case where the target duty ratio DUTTGTH is not more than the output Uslbf, step S24 is entered, and the ECU 20 judges that the target duty ratio DUTTGTH is in region 0 outside the hysteresis region 40 and that no hysteresis compensation is needed. In the case where the target duty ratio DUTTGTH is larger than the output Uslbf, step S27 is entered, and the ECU 20 judges that the target duty ratio DUTTGTH is in region 1 inside the hysteresis region 40 and that a hysteresis compensation is needed.

As above-mentioned, in the case where it is judged in step S22 that the difference ETHL[k] is not more than the threshold C_DUTGAPHL, step S28 is entered.

In step S28, the ECU 20 judges whether or not the difference ETHL[k] is larger than the threshold C_DUTGAPLL, in order to judge whether or not the movement in the closing direction made by the throttle valve 16 needs a hysteresis compensation. In the case where the difference ETHL[k] is not more than the threshold C_DUTGAPLL, step S29 is entered, and the ECU 20 judges that the movement in the closing direction made by the throttle valve 16 is so large as not to need any hysteresis compensation, in other words, the difference ETHL is in region 4 in FIG. 12 and no hysteresis compensation is needed. On the other hand, in the case where it is judged in step 828 that the difference ETHL[k] is larger than the threshold C_DUTGAPLL, step S30 is entered.

In step S30, the ECU 20 judges whether or not the difference ETHL is less than the threshold C_DUTGAPLH. In the case where the difference ETHL is not less than the threshold C_DUTGAPLH, step S31 is entered, and it is judged that the current situation is region 2. Where the difference ETHL is less than the threshold C_DUTGAPLH, step S32 is entered.

In step S32, the ECU 20 judges a target duty ratio DUTTGTL [%] necessary for actually moving the throttle valve 16 in the closing direction, according to the target opening DTHR. The target duty ratio DUTTGTL is preliminarily stored in a memory (not shown) on the basis of each target opening DTHR.

In step S33, the ECU 20 judges whether or not the target duty ratio DUTTGTL is less than the output Uslbf (Uslbf=Ueq+Urch+Udamp) which has been judged in step S11. In the case where the target duty ratio DUTTGTL is not less than the output Uslbf, step S29 is entered, and the ECU 20 judges that the target duty ratio DUTTGTL is in region 4 outside the hysteresis region 40 and that no hysteresis compensation is needed. Where the target duty ratio DUTTGTL is less than the output Uslbf, step S34 is entered, and the ECU 20 judges that the target duty ratio DUTTGTL is in region 3 inside the hysteresis region 40 and that a hysteresis compensation is needed.

Figure 14:
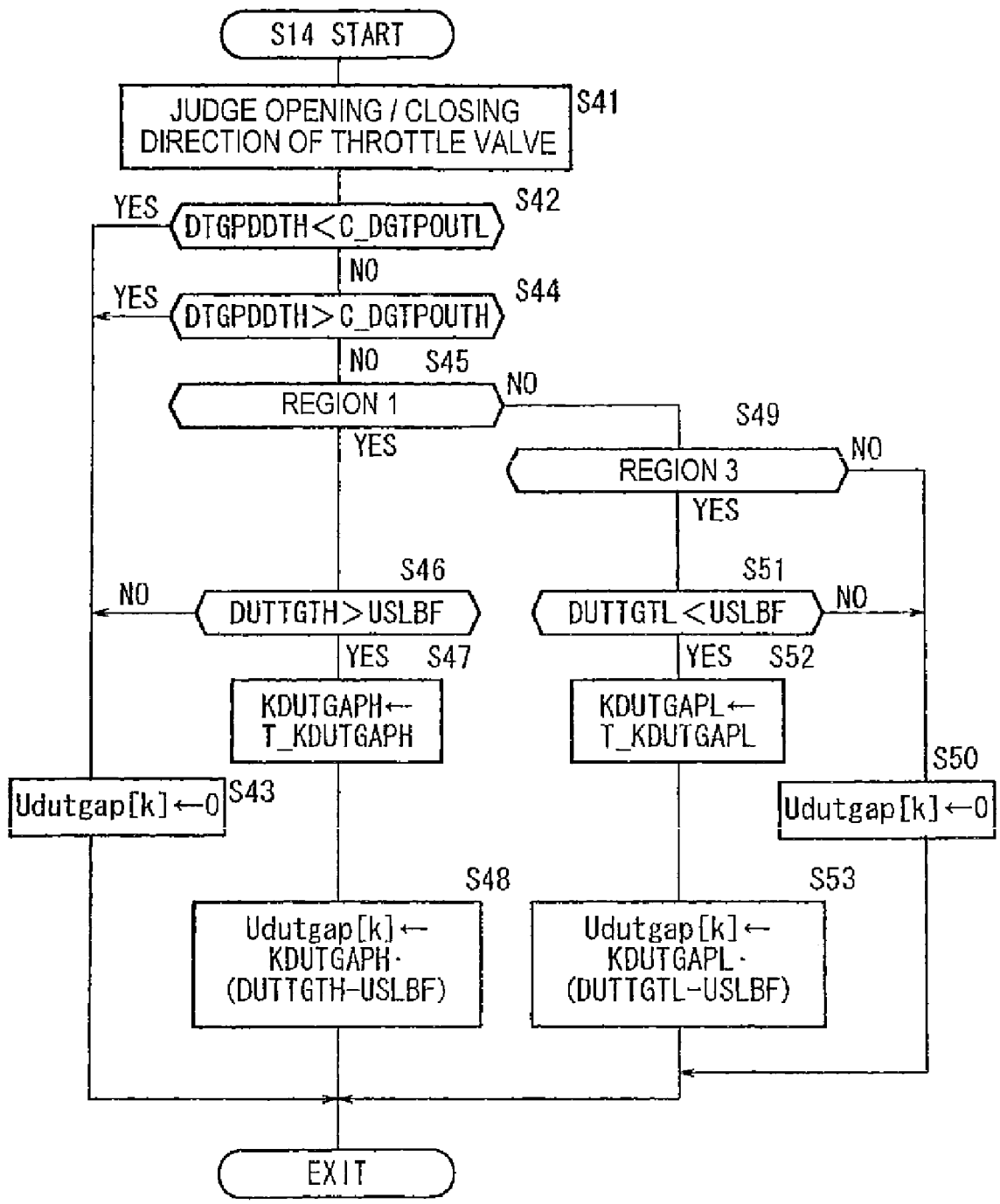
FIG. 14 is a flowchart for judging a specific numerical value of the hysteresis compensation output used in hysteresis compensation.

The judging method for specific numerical value of hysteresis compensation output Udutgap[k] (Step S14) is described next FIG. 14 shows a flowchart for the ECU 20 to judge the specific numerical value of the hysteresis compensation output Udutgap[k].

In step S41, the ECU 20 judges the moving direction of the throttle valve 16. Specifically, the ECU 20 judges the moving direction of the throttle valve 16 by detecting whether the speed variation DTGDDRTHR [degrees/sec] of the target opening DTH is positive or negative. Or, alternatively, in consideration of an error, instead of simply detecting whether the speed variation DTGDDRTHR is positive or negative, the moving direction of the throttle valve 16 may be judged according to whether or not the speed variation DTGDDRTHR exceeds each of a positive predetermined value and a negative predetermined which are preliminarily set.

In step S42, it is judged whether or not the speed variation DTGDDTH [degrees/sec] of the actual opening DTH is larger than a negative threshold C_DGTPOUTL [degrees/sec]. The negative threshold C_DGTPOUTL is for judging whether a hysteresis compensation is needed or not in the case of a closing operation of the throttle valve 16.

In the case where the speed variation DTGDDTH is smaller than the threshold C_DGTPOUTL, step S43 is entered, and the hysteresis compensation output Udutgap[k] is set to zero. Where the speed variation DTGDDTH is not less than the negative threshold C_DGTPOUTL, step S44 is entered.

In step S44, like in step S43, it is judged whether or not the speed variation DTGDDTH of the actual opening DTH is larger than a positive threshold C_DGTPOUTH. In the case where the speed variation DTGDDTH is larger than the positive threshold C_DGTPOUTH, step S43 is entered, and the hysteresis compensation output Udutgap[k] is set to zero. Where the speed variation DTGDDTH is not more than the positive threshold C_DGTPOUTH, step S45 is entered.

In step S45, the ECU 20 judges whether or not the difference ETHL is in region 1. In the case where the difference ETHL is in region 1, step S46 is entered; on the other hand, where the difference ETHL is not in region 1, step S49 is entered.

In step S46, the ECU 20 judges whether or not the target duty ratio DUTTGTH at the time of opening the throttle valve 16 is larger than the sum Uslbf (Uslbf=Ueq+Urch+Udamp) which has been calculated in step S11. Where the target duty ratio DUTTGTH is not more than the sum Uslbf, step S43 is entered, and the hysteresis compensation output Udutgap is set to zero. Where the target duty ratio DUTTGTH is larger than the sum Uslbf, step S47 is entered.

In step S47, the ECU 20 reads a coefficient KDUTGAPH from a preset table T_KDUTGAPH. The coefficient KDUTGAPH is included in the above-mentioned function Kdut, and has the characteristic as shown in FIG. 9A. Specifically, the coefficient KDUTGAPH has such a characteristic that it decreases with an increase in the target opening DTHR of the throttle valve 16.

In step S48, the ECU 20 calculates a hysteresis compensation output Udutgap by use of the following formula (9):

$$Udutgap[k]=KDUTGAPH(DTHR[k])\cdot(DUTTGTH[k]-USLBF[k]) \qquad (9)$$

In the case where it is judged in step S45 that the difference ETHL is not in region 1, it is judged in step S49 whether or not the difference ETHL is in region 3. Where the difference ETHL is not in region 3, step S50 is entered, in which Udutgap[k] is set to zero. Where the difference ETHL is in region 3, step S51 is entered.

In step S51, the ECU 20 judges whether or not the target duty ratio DUTTGTL is smaller than the sum Uslbf (Uslbf=Ueq+Urch+Udamp) which has been calculated in step S11. In the case where the target duty ratio DUTTGTH is not smaller than the sum Uslbf, step S50 is entered, in which the hysteresis compensation output Udutgap is set to zero. Where the target duty ratio DUTTGTH is smaller than the sum Uslbf, step S52 is entered.

In step S52, the ECU 20 reads a coefficient KDUTGAPL from a preset table. The coefficient KDUTGAPL is included in the above-mentioned function Kdut, and has a characteristic as shown in FIG. 9B. Specifically, the coefficient KDUTGAPL has such a characteristic as to decrease with a decrease in the target DTHR of the throttle valve 16. Incidentally, it is to be noted that, in FIG. 9B, the positive/negative sense of the axis of abscissas is reversed.

In step S53, the ECU 20 calculates the hysteresis compensation output Udutgap by use of the following formula (10):

$$Udutgap[k]=KDUTGAPL(DTHR[k])\cdot(DUTTGTL[k]-USLBF[k]) \qquad (10)$$

The effects of the embodiment of the present invention include the following:

As has been described above, in the engine output controller 11 according to the this embodiment, in generating the control signal Sc, the ECU 20 reduces the damping output Udamp when the switching function value σ in the sliding mode control is near zero.

In the embodiment above, the damping output Udamp is reduced when the switching function value σ is near zero, and, as a result, the influence of the damping output Udamp on the output of the motor 18 is reduced. In general, when the switching function value σ is near zero, the actual opening DTH converges while maintaining the robust property of the target opening DTHR. In this case, the possibility for the actual opening DTH to overshoot the target opening DTHR is low, whereas a high response performance is required for the next acceleration or deceleration. Therefore, according to this embodiment, a high response performance as to the control of the actual opening DTH of the throttle valve 16 can be realized in these cases.

Besides, in this embodiment, the ECU 20 increases the damping output Udamp according to an increase in the variation σ[k]−σ[k−1] of the switching function value σ per unit time.

In general, the variation in the switching function value σ varies depending on the acceleration of the throttle valve 16. In addition, where the acceleration is great, the actual opening DTH of the throttle valve 16 is liable to exceed (liable to overshoot) the target opening DTHR. Therefore, by increasing the damping output Udamp according to an increase in the variation in the switching function value σ per unit time, it becomes easier to restrain the above-mentioned overshooting. Particularly, in the case of the configuration in which the damping output Udamp is reduced when the switching function value σ is near zero as above-mentioned, it is possible to prevent the overshooting from occurring when the variation in the switching function value σ per unit time is large, even though the switching function value σ is near zero.

Incidentally, the present invention is not limited to the above-described embodiment, and various configurations can naturally be adopted based on the contents of the present specification. For example, the configurations as described in the following (1) to (5) can be adopted.

(1) Vehicle

While the vehicle 10 has been a motorcycle in the above-described embodiment, this is not limitative. For example, the vehicle may be a four-wheel vehicle.

(2) Target Opening Input Means

While the throttle grip 22 has been used as a means for inputting the target opening DTHR in the above-described embodiment, this is not limitative. For example, an accelerator pedal may also be used as the input means.

In addition, while the throttle grip 22 and the potentiometer 24 have been described as separate elements in the above-described embodiment, they may be of an integral form.

(3) Control Method

While a sliding mode control has been used as a control method in the above-described embodiment, this is not limitative. For example, a nonlinear robust control other than the sliding mode control or a linear robust control may also be used.

In the embodiment above, the gain characteristic value Kdamp in the formula (4) which is for calculating the damping output Udutgap has been defined by the following formula (5).

$$K\text{damp}=T\_K\text{dump}1 \cdot T\_K\text{dump}2 \quad (5)$$

However, the gain characteristic value Kdamp may be defined by use of only the gain characteristic value T_Kdump1 or only the gain characteristic T_Kdump2.

In addition, a configuration in which the gain characteristic value Kdamp is not used in the formula (4) may also be adopted.

Further, use of the variation in the deviation e per unit time, "e(k)−e(k−1)" in place of the variation in the switching function value σ per unit time, "σ(k)−σ(k−1)" in the above formula (4) can also produce a similar effect.

(4) Control Signal

While the output of the motor 18 has been controlled by use of the duty ratio DUT of the control signal Sc, the output of the motor 18 can be varied also by modifying other output characteristic than the duty ratio. For example, the output of the motor 18 can also be varied by varying the number of pulses, the amplitude or the frequency of the control signal Sc.

(5) Opening of Throttle Valve

While the opening deviation quantity DTH, i.e., a quantity indicative of the relation between the default opening THDEF of the throttle valve 16 and the opening TH showing the absolute position of the throttle valve 16 (DTH=TH−THDEF) has been used as an indication of the actual opening of the throttle valve 16, the opening TH may also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving amount controller for controlling a driving amount of a controlled system by way of an output of a motor, comprising:

a target driving amount input device adapted to input a target driving amount DTHR for said controlled system; and an ECU adapted to transmit to said motor a control signal for controlling the output of said motor with an output characteristic according to said target driving amount DTHR, wherein said ECU is adapted to add to said control signal a damping output Udamp for suppressing an overshoot of an actual driving amount relative to said target driving amount DTHR for said controlled system at a time of generating said control signal, and reduce said damping output Udamp only part way to zero when a switching function value σ in sliding mode control is near zero, wherein U damp is defined by the following formula (6):

$$U\text{damp}[k]=-K\text{damp}\cdot(\sigma[k]-\sigma[k-1])/b1 \quad (6),$$

wherein Kdamp is a gain characteristic value defined by the following formula (7)

$$K\text{damp}=T\_K\text{dump}1 \cdot T\_K\text{dump}2 \quad (7),$$

wherein T_Kdump1 is a positive gain characteristic value which is enlarged when the target opening amount DTHR of the control system exceeds a positive predetermined value s, and wherein T_Kdump2 is a positive gain characteristic value which is reduced in an equivalent linear manner when the switching function value σ is positive and in the vicinity of zero, and also when the switching function value σ is negative and in the vicinity of zero.

2. The driving amount controller as set forth in claim 1, wherein said controlled system is a throttle valve, and said target driving amount DTHR is an opening of said throttle valve.

3. The driving amount controller as set forth in claim 1, wherein said ECU is adapted to increase said damping output Udamp according to an increase in a variation in said switching function value σ unit time.

4. The driving amount controller as set forth in claim 2, wherein said ECU increases said damping output Udamp according to an increase in a variation in said switching function value σ per unit time.

5. The driving amount controller as set forth in claim 2, wherein the ECU is adapted to regulate the opening of the throttle valve through an output according to a duty ratio DUT.

6. The driving amount controller as set forth in claim 3, when the switching function value σ has a value far from zero, an absolute value of the damping output Udamp is increased, whereby the switching function value σ is brought close to a switching straight line.

7. The driving amount controller as set forth in claim 4, when the switching function value σ has a value far from zero, an absolute value of the damping output Udamp is increased, whereby the switching function value σ is brought close to a switching straight line.

8. The driving amount controller as set forth in claim 1, wherein the target driving amount input device is a throttle grip.

9. The driving amount controller as set forth in claim 1, wherein the target driving amount input device is an accelerator pedal.

10. A driving amount controller for controlling a driving amount of a controlled system by way of an output of a motor, comprising:
  a target opening amount input device adapted to input a target opening amount DTHR for said controlled system; and
  an ECU adapted to transmit to said motor a control signal for controlling the output of said motor with an output characteristic according to said target opening amount DTHR,
  wherein said ECU is adapted to
  add to said control signal a damping output Udamp for suppressing an overshoot of an actual opening amount relative to said target opening amount DTHR for said controlled system at a time of generating said control signal, and
  reduce said damping output Udamp only part way to zero when a switching function value σ in sliding mode control is near zero,
  wherein U damp is defined by the following formula (6):

$$U\mathrm{damp}[k] = -K\mathrm{damp} \cdot (\sigma[k] - \sigma[k-1])/b1 \quad (6),$$

wherein Kdamp is a gain characteristic value defined by the following formula (7)

$$K\mathrm{damp} = T\_K\mathrm{dump}1 \cdot T\_K\mathrm{dump}2 \quad (7),$$

wherein T_Kdump1 is a positive gain characteristic value which is enlarged when the target opening amount DTHR of the control system exceeds a positive predetermined value s and
  wherein T_Kdump2 is a positive gain characteristic value which is reduced in an equivalent linear manner when the switching function value σ is positive and in the vicinity of zero, and also when the switching function value σ is negative and in the vicinity of zero.

11. The driving amount controller as set forth in claim 10, wherein said controlled system is a throttle valve, and said target opening amount DTHR is an opening amount of said throttle valve.

12. The driving amount controller as set forth in claim 10, wherein said ECU is adapted to increase said damping output according to an increase in a variation in said switching function value σ per unit time.

13. The driving amount controller as set forth in claim 11, wherein said ECU increases said damping output Udamp according to an increase in a variation in said switching function value σ per unit time.

14. The driving amount controller as set forth in claim 10, wherein the ECU is adapted to regulate the actual opening amount of the controlled system through an output according to a duty ratio DUT,
  wherein the duty ratio DUT includes an add-in amount x which is calculated by a positive quadratic equation, and as a result the add-in amount x increases with an increase in a difference between a current target opening DTHR[k] of the controlled system and a last target opening DTHR[k−1] of the controlled system.

15. The driving amount controller as set forth in claim 11, wherein the ECU is adapted to regulate the opening of the throttle valve through an output according to a duty ratio DUT.

16. The driving amount controller as set forth in claim 12, when the switching function value σ has a value far from zero, an absolute value of the damping output Udamp is increased, whereby the switching function value σ is brought close to a switching straight line.

17. The driving amount controller as set forth in claim 13, when the switching function value σ has a value far from zero, an absolute value of the damping output Udamp is increased, whereby the switching function value σ is brought close to a switching straight line.

18. The driving amount controller as set forth in claim 10, wherein the target opening amount input device is a throttle grip.

19. The driving amount controller as set forth in claim 10, wherein the target opening amount input device is an accelerator pedal.

20. A driving amount controller for controlling a driving amount of a controlled system by way of an output of a motor, comprising:
  a target driving amount input device adapted to input a target driving amount DTHR for said controlled system; and
  an ECU adapted to transmit to said motor a control signal for controlling the output of said motor with an output characteristic according to said target driving amount DTHR,
  wherein said ECU is adapted to
  add to said control signal a damping output Udamp for suppressing an overshoot of an actual driving amount relative to said target driving amount DTHR for said controlled system at a time of generating said control signal, and
  reduce said damping output Udamp when a switching function value σ in sliding mode control is near zero,
  wherein the ECU is adapted to regulate an opening of the controlled system through an output according to a duty ratio DUT,
  wherein the duty ratio DUT includes an add-in amount x which is calculated by a positive quadratic equation, and as a result the add-in amount x increases with an increase in a difference between a current target opening DTHR[k] of the controlled system and a last target opening DTHR[k−1] of the controlled system.

21. The driving amount controller as set forth in claim 20, wherein the add-in amount x increases with the increase in the difference between the current target opening DTHR[k] of the controlled system and the last target opening DTHR[k−1] of the controlled system during both acceleration and deceleration of the controlled system.

22. The driving amount controller as set forth in claim 20, wherein the positive quadratic equation forms a positive quadratic curve of which the vertex coincides with the origin, and an absolute value of an inclination of a tangent to the curve increases as a point of contact comes away from an origin.

23. The driving amount controller as set forth in claim 20, wherein the add-in amount x is defined by the following formula (4):

$$x = Ueq[k] = \{(1-a1-VPOLE)\cdot DTH[k]+(VPOLE-a2)\cdot DTH[k-1]+KDDTHR\cdot (DTHR[k]-DTHR[k-1])^2-c1\}\cdot (1/b1) \quad (4),$$

wherein a coefficient "KDDTHR" represents a positive coefficient, a coefficient "$(DTHR[k]-DTHR[k-1])^2$" is a square of a difference between the current target opening DTHR[k] and the last target opening DTHR[k−1].

* * * * *